Oct. 4, 1932.  C. R. PATON ET AL  1,881,127

CLUTCH

Filed Feb. 21, 1930  2 Sheets-Sheet 2

INVENTOR
William S. James and Clyde R. Paton
BY P. W. Pomeroy
ATTORNEY

Patented Oct. 4, 1932

1,881,127

UNITED STATES PATENT OFFICE

CLYDE R. PATON AND WILLIAM S. JAMES, OF SOUTH BEND, INDIANA, ASSIGNORS TO THE STUDEBAKER CORPORATION, OF SOUTH BEND, INDIANA, A CORPORATION OF NEW JERSEY

CLUTCH

Application filed February 21, 1930. Serial No. 430,300.

This invention relates to vehicle clutches and particularly to means provided therein for absorbing engine vibrations, and for cushioning and damping torque variations in car driving members.

The principal object of the invention is to provide a vehicle clutch with a resilient driving connection between the driving plate or plates and the clutch hub to absorb torsional vibrations existing in the driving members, frictional means being provided to dampen the torsional movement between the clutch hub and the clutch plates.

Another object is to provide a vehicle clutch with resilient non-metallic members between the clutch plates and the clutch hub whereby engine vibrations and noises are prevented from being transmitted to the vehicle transmission and to insure smoother operation and longer life of the latter.

A further object is to provide a vehicle clutch with a rubberized fabric member between the clutch plate and the clutch hub thereof to form a resilient driving connection, a non-metallic friction member being also provided to engage with a face of the clutch plate to resist the torsional movement of the plate relative to the hub.

A still further object is to provide a vehicle clutch with a pluarlity of clutch plates and a clutch hub, rubberized fabric members being positioned between the clutch plates and the hub to permit torsional movement of the plates relative to the hub, and a rubberized fabric member being positioned between the clutch plates to provide a spacing member therebetween.

These being among the objects of the present invention, the same consists of certain features of construction and combination of parts to be hereinafter described with reference to the accompanying drawings, and then claimed, having the above and other objects in view.

In the accompanying drawings which illustrate a suitable embodiment of the present invention and in which like numerals refer to like parts throughout the several views, Figure 1 is a longitudinal sectional view of the vehicle clutch embodying our invention, certain parts being shown in full lines and parts of the engine and transmission in dotted lines to more clearly illustrate the invention.

Figure 1:
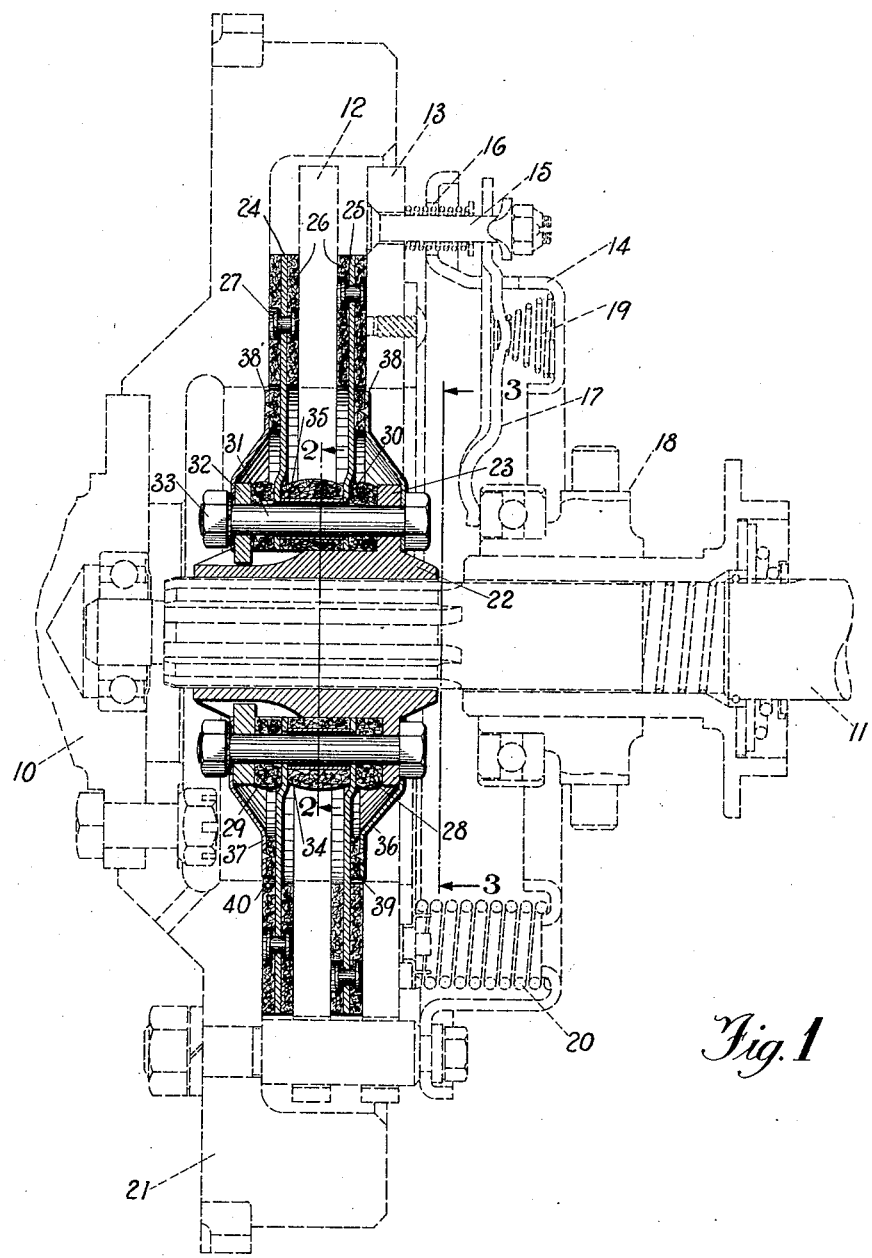

In the type of clutch illustrated in the drawings, driving torque is transmitted from the engine crankshaft 10 to the vehicle transmission driving shaft 11 by means of the clutch comprising pressure plates 12 and 13, a cover plate 14, releasing pins 15 mounted in the pressure plate 13 extending through openings 16 in the cover plate 14, releasing levers 17 carried by the releasing pins 15 engaging with a shifting collar 18 and maintained in operative engagement therewith by means of the springs 19 positioned between the cover plate 14 and the levers 17, and coil springs 20 tending to force the pressure plate 13 toward the flywheel 21 of the engine. The clutch hub 22 splined on to the end of the transmission drive shaft 11 is provided with a flange 23 which may be formed as an integral part thereof as shown, or welded or otherwise secured thereto for a purpose to be hereinafter specified.

The clutch construction heretofore described is for the purpose of illustration only and in detail forms no part of our invention, except in so far as it is adaptable for use with our invention. In the type of clutch illustrated, driving torque is transmitted from the engine crankshaft 10 by means of clutch plates 24 and 25, the clutch plate 24 being positioned between the flywheel 21 and the pressure plate 12, and the clutch plate 25 positioned between the pressure plates 12 and 13 which are brought together by the pressure exerted by the springs 20 to drive the plates 24 and 25 having clutch plate facings 26 secured to opposite sides thereof by a plurality of rivets 27.

A resilient driving connection is developed in the present invention by means of circular resilient disks 28 and 29 of yieldable elastic material, such as rubberized fabric having suitable resiliency, however, other suitable materials capable of serving the purpose specified may be substituted and our invention is not limited to the use of rubberized fabric for the purpose specified.

The clutch plates 24 and 25 are provided with openings 30 therein through which are inserted bolts 31 which extend through the flange 23, the elastic disks 28 and 29 and the retaining ring 32, and are clamped in position by means of the nuts 33 screw-threaded on the bolts 31, as is clearly shown in Figure 1. The openings 30 in the plates 24 and 25 are slightly larger than the bolts 31 to permit limited torsional movement of the clutch plates 24 and 25 relative to the hub 22, the torsional movement being resisted by the elastic disks 28 positioned between the flange 23 and the clutch plate 25 and the disk 29 positioned between the retaining ring 32 and the clutch plate 24.

In multiple disk clutches, it is desirable and necessary to properly position the clutch plates relative to the pressure plate interposed therebetween and in the present case, we have provided a resilient washer 34 through which extend ferrules 35 adapted to receive the bolts 31, the ferrules 35 having a diameter larger than the bolts 31 to permit torsional movement of the clutch plates 24 and 25 relative to the hub 22. The ferrules 35 are preferably of a length corresponding with the distance the clutch plates 24 and 25 are to be spaced apart and the washer is of a thickness somewhat greater than the length of the ferrules 35. When the clutch parts are assembled in the position shown in Figure 1 and the nuts 33 are threaded home on the bolts 31, the resilient material forming the spacer 34 is compressed whereupon the plates 24 and 25 will seat against the ends of the ferrules 35 to properly space the same in correct position relative to the pressure plate 12.

As previously explained, it is desirable to limit the degree of torsional movement between the clutch hub 22 and the clutch plates 24 and 25 which movement is limited by the size of the openings 30 in the plates 24 and 25 and the inner diameter of the ferrules 35 interposed between these clutch plates.

Figure 3:
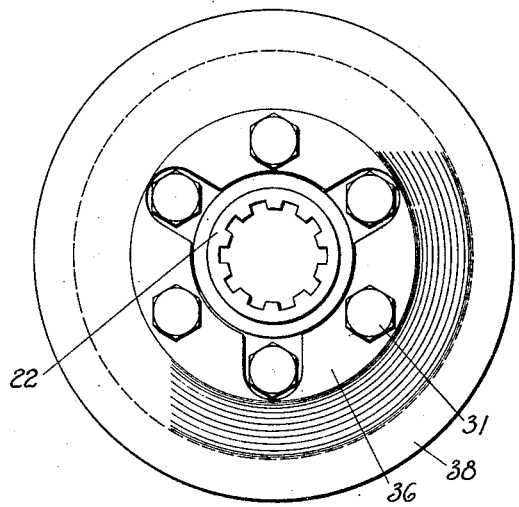
Figure 3 is a sectional view taken on the line 3—3 of Figure 1.

The amount of friction between the clutch plates 24 and 25 and the clutch hub 22 is regulated to a limited extent by the nuts 33 on the bolts 31. We prefer, however, to provide further regulating means which as shown in Figures 1 and 3, comprises the member 36 positioned between the heads of the bolts 31 and the flange 23, and the member 37 positioned between the retaining member 32 and the nuts 33. The members 36 and 37 are preferably dished to provide radial flange portions 38 and 38' adjacent to the clutch plates 25 and 24 to which are secured friction material 39 and 40 adapted to engage with the faces of the clutch plates 25 and 24 respectively, as is clearly shown in Figure 1. The members 36 and 37 are preferably formed to exert pressure on the disks 39 and 40 to set up a resistance between the disks 39 and 40 and the clutch plates 25 and 24 whereby the torsional movement of the plates 25 and 24 relative to the hub 22 is resisted by these members.

Figure 5:
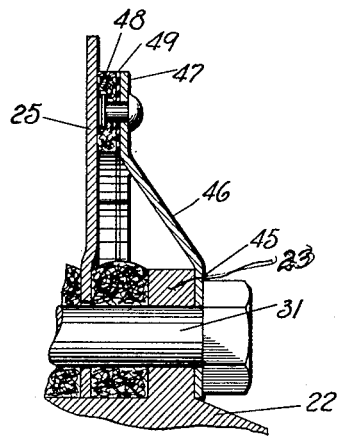
Figure 5 is an enlarged sectional view taken on the line 5—5 of Figure 4.
Figure 4:
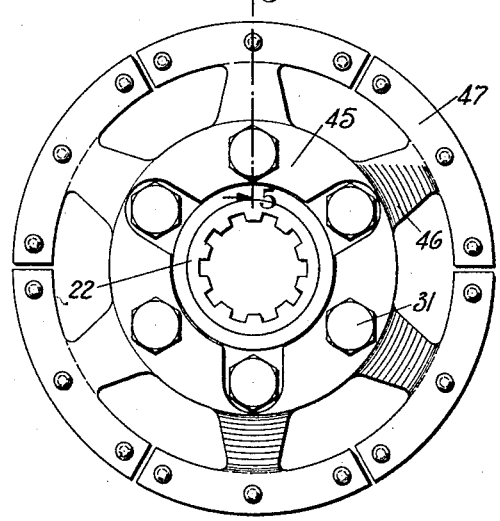
Figure 4 is a view similar to Figure 3 showing a modified embodiment of our invention.
Figure 2:
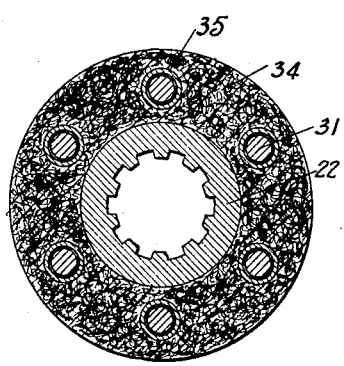
Figure 2 is a transverse sectional view taken substantially on the line 2—2 of Figure 1.

In Figures 4 and 5, we have shown a member 45 secured between the heads of the bolts 31 and the flange 23 which has a plurality of spokes 46 carrying flange segments 47 to which are attached friction material 48 having a sheet of resilient material 49 interposed therebetween, the material 48 being adapted to have torsional movement relative to the rivets which secure it to the flange segments. The spokes 46 tend to force the friction material 48 against the clutch plate 25 to resist the torsional movement of the clutch plate 25 relative to the clutch hub 22. As it is desirable to permit small torsional movement of the plates 25 and 24 relative to the hub 22, the elastic material 49 interposed between the segment 47 and the friction material 48 will permit of this slight torsional movement before the larger torsional movement is frictionally resisted by the friction members 48. While we have shown in Figure 5 the friction material 48 as having a resilient backing member 49 engaging the clutch plate 25, it is to be understood that this same construction may be duplicated to provide the torsional resisting means relative to the clutch plate 24.

In regard to the function and arrangement of the parts 47, 48 and 49 in Figures 4 and 5, it will be observed that the part 47 is a flange segment carried by a spoke 46 supported by the head of the bolt 31 between the bolt head and the flange 23. The flange segment 47 is rigidly supported by a spoke 46 and has mounted thereon, by means of rivets or other equivalent structure, a member 48 formed of friction material, between which and the flange 47 is inserted a strip 49 of resilient material. The outer surface of the member 48 bears against the surface of the disk 25 and is maintained in frictional engagement therewith. As the disk 25 moves in relation to the flange 47, the surface of the member 48 bearing against the disk 25 will be pulled in the direction of movement of the disk. The surface of the member 48 adjacent to the flange 47 will move in the same direction to the limit of flexibility of the resilient member 49, and in addition a certain amount of distortion will occur in the fiber of the member 48 whereby the surface adjacent the disk 25 will move in the direction of movement of the disk, somewhat further than the surface adjacent to the flange 47. The member 48 may be loosely secured to the flange 47 by the rivets or other equivalent securing means in order to provide this function, or alternately, it may be firmly secured to the points of engagement and the resiliency of the material between these points, depended upon to provide the function described. The movement of the surface of the member 48 contacting with the disk 25 relative to the flange 47, will, of course, be very small, but it has been found that such a small movement is entirely sufficient to provide the dampening function for which this element has been designed.

The operation of the clutch will be apparent from the foregoing description and it will be seen that vibrations caused by sudden accelerations and decelerations of the engine or driving member are cushioned by the relative movements between the clutch plates 24 and 25 and the clutch hub 22, the openings 30 in the clutch plates 24 and 25 allowing this movement. The elastic members 28 and 29 permit of torsional movement between the clutch plates 24 and 25 and the hub 22, the degree of movement being limited by the openings in the clutch plates. It will also be seen that the frictional resistance between the clutch plates 24 and 25 and hub 22 is regulated by the adjusting nuts 33 on the bolts 31 and that the torsional movement of the clutch plates 24 and 25 relative to the clutch hub 22 is resisted by the frictional members 39 and 40 engaging the faces of the clutch plates 25 and 24. It will also be apparent that in any driving mechanism having a driving member and a driven member in which there is a relative movement between the respective members that our friction means may be employed and that the device is effective for damping out vibrations whether the drive is from the engine to the transmission or vice versa. It is understood that we do not wish to be limited to the use of this device in clutches but instead the same may be used in any driving mechanism having a relative movement between the driving and driven members.

The present invention operates both when the drive is from the engine to the rear axle and when it is from the rear axle to the engine. It is evident under normal driving conditions that the clutch plates prevent engine vibrations and sudden torque impulses from being transmitted to the transmission with the result that the life of the transmission is prolonged and that smoother operation of the same is obtained. The clutch plates and their associated parts may be identical in construction and are simple to manufacture and easy to assemble.

Although preferred embodiments of the invention are shown in the drawings, it is to be understood that formal changes may be made in the specific embodiment of the invention described without departing from the spirit and substance of the broad invention, the scope of which is commensurate with the appended claims.

What we claim is:

1. In a clutch, a plurality of clutch plates, a hub therefor having movement relative thereto, a circumferential flange on said hub, a retaining member, elastic disks positioned between said flange, retaining member, and clutch plates respectively, means holding said disks in frictional contact with said flange and retaining member to cushion the movement between said hub and plates, means for limiting the movement between said hub and plates, and friction members for resisting the relative movement between said hub and plates.

2. In a clutch having a plurality of clutch plates and a hub therefor, having in combination therewith, means for cushioning and damping the movement between said hub and plates, and means between said plates comprising an elastic portion and a non-resilient portion for spacing said plates.

3. In a clutch having a pressure plate, a plurality of clutch plates on opposite sides thereof, and a clutch hub therefor, having in combination therewith, means for cushioning the movement between said hub and plates, and a plurality of spacing rings surrounded by an elastic member for spacing said clutch plates relative to said pressure plate.

4. In a clutch having a pressure plate, a plurality of clutch plates, and a hub therefor, having in combination therewith, a retaining ring, elastic means interposed between one of said plates and said retaining ring and elastic means interposed between the other of said plates and said hub for cushioning the movement between said hub and plates, and friction means engaging the faces of said plates for damping the movement between said hub and plates.

5. In a clutch having a pressure plate, a plurality of clutch plates on opposite sides thereof, and a hub therefor, having in combination therewith, a retaining ring, elastic means between said ring and one of said plates, elastic means between the other of said plates and said hub, means extending through said hub, elastic means, plates and ring for retaining said members in operative position and to permit torsional movement of said plates relative to said hub, and friction means engaging faces of said plates for damping the torsional movement between said hub and plates.

6. In a clutch having a clutch plate and a hub therefor, having in combination therewith, means interposed between said plate and hub permitting limited torsional movement therebetween, a member scured to said hub extending adjacent to the face of said plate, and means carried by said member engaging a face of said plate for resisting the torsional movement between said hub and plate, said means comprising a friction material and an elastic material whereby small torsional movement of said plate relative to said hub is permitted before being frictionally resisted.

7. In a clutch having a clutch plate and a hub therefor, having in combination therewith, elastic means interposed between said plate and hub in frictional contact therewith to permit torsional movement therebetween, means for adjusting said plate relative to said hub to regulate the torsional movement therebetween, a member secured to said hub extending adjacent to the face of said plate, and a friction member carried by said last named member engaging a face of said plate for resisting the torsional movement between said hub and plate.

Signed by us at South Bend, Indiana, this 17th day of February, 1930.

CLYDE R. PATON.
WILLIAM S. JAMES.